US 6,679,805 B2

(12) United States Patent
Rienks et al.

(10) Patent No.: US 6,679,805 B2
(45) Date of Patent: Jan. 20, 2004

(54) CONTROL SYSTEM AND CONTINUOUSLY VARIABLE TRANSMISSION PROVIDED THEREWITH

(75) Inventors: Maurice Didier Rienks, Eindhoven (NL); Engbert Spijker, Helmond (NL)

(73) Assignee: Van Doorne's Transmissie BV, Tilburg (NL)

( * ) Notice: Subject to any disclaimer, the term of this patent is extended or adjusted under 35 U.S.C. 154(b) by 47 days.

(21) Appl. No.: 10/024,003

(22) Filed: Dec. 21, 2001

(65) Prior Publication Data

US 2002/0132698 A1 Sep. 19, 2002

(30) Foreign Application Priority Data

Dec. 21, 2000 (EP) ............................................. 00204670

(51) Int. Cl.[7] .............................. F16H 63/24; F16H 9/10
(52) U.S. Cl. ............................. 477/49; 477/46; 474/28
(58) Field of Search ....................... 474/18, 28; 477/45, 477/48, 49, 46; 251/31

(56) References Cited

U.S. PATENT DOCUMENTS

| | | | | |
|---|---|---|---|---|
| 4,608,031 A | * | 8/1986 | Vahabzadeh | 474/17 |
| 5,230,663 A | * | 7/1993 | Reniers | 474/18 |
| 5,269,726 A | * | 12/1993 | Swanson et al. | 474/28 |
| 5,888,168 A | * | 3/1999 | Niiyama et al. | 477/49 |
| 5,944,626 A | * | 8/1999 | Spiess et al. | 474/28 |
| 6,299,564 B1 | * | 10/2001 | Gessler et al. | 477/45 |
| 6,336,880 B1 | * | 1/2002 | Agner | 474/28 |
| 6,517,455 B1 | * | 2/2003 | Van Wijk et al. | 474/18 |

FOREIGN PATENT DOCUMENTS

| | | |
|---|---|---|
| DE | 195 46293 | 6/1996 |
| EP | 0 841 504 | 5/1998 |
| EP | 0 940 605 | 9/1999 |
| EP | 1 048 879 | 11/2000 |

\* cited by examiner

Primary Examiner—Marcus Charles
Assistant Examiner—Bradley J. Van Pelt
(74) Attorney, Agent, or Firm—Young & Thompson

(57) ABSTRACT

A control system for a continuously variable transmission provided with a first pulley (1) having two pulley discs (5, 7), with a second pulley (2) having two pulley discs (6, 8) and with a drive belt (10) wound around said pulleys (1, 2) for transmitting torque there between, at least one disc (7) of the first pulley (1) being axially movable with respect to the other disc (5) of the pulley (1) under the influence of an axial force provided on the movable disc (7) by a line pressure ($P_{LP}$) in a cylinder (11) of a piston/cylinder assembly (11, 13) associated with the the first pulley (1) and at least one disc (6) of the second pulley (2) being axially movable with respect to the other disc (8) of the pulley (2) under the influence of an axial force provided on the movable disc (8) by a second cylinder pressure ($P_{2CP}$) in a cylinder (12) of a piston/cylinder assembly (12, 14) associated with the the second pulley (2). The control system is arranged to control the second cylinder pressure ($P_{2CP}$) between two pressure levels ($P_{LP}$; $P_R$) by a second valve (32) that may be influenced not only by a control pressure ($P_C$), but also by the second cylinder pressure ($P_{2CP}$).

16 Claims, 4 Drawing Sheets

CONTROL SYSTEM AND CONTINUOUSLY VARIABLE TRANSMISSION PROVIDED THEREWITH

BACKGROUND OF THE INVENTION

The invention relates to a control system according to the preamble of claim 1. The invention further relates to a continuously variable transmission, alternatively denoted CVT, provided with such a control system. The control system and CVT are known, for example, from EP-A-0,787,927 and are particularly suited for application in motor vehicles.

DESCRIPTION OF THE INVENTION

The known CVT comprises a V-type drive belt wound around a first pulley provided on a first shaft and a second pulley provided on a second shaft. Both pulleys have two conical discs, an axial separation of which is adjustable by means of a piston/cylinder assembly of the pulleys. During operation of the transmission the drive belt is clamped with a first clamping force between the discs of the first pulley and with a second clamping force between the discs of the second pulley, whereby each clamping force is effected by pressurised hydraulic medium in the piston/cylinder-assembly of the respective pulleys. The level of the clamping forces determines the maximum torque level that can be transmitted between the first and the second shaft virtually without relative movement in the tangential direction between the drive belt and the discs of the pulleys occurring. Such relative movement is alternatively denoted as belt slip and is highly undesirable because it may lead to considerable wear of the drive belt. The said maximum torque level is referred to as the torque transmitting capacity of the CVT. In the known CVT a speed ratio of the rotational speeds of the first and second shafts is inversely related to the ratio of the running radii of the drive belt between the discs of the first and the second pulley, which may be changed by changing the ratio of the clamping forces.

The CVT is provided with a control system for determining a first cylinder pressure in the piston/cylinder assembly of the first pulley and a second cylinder pressure in the piston/cylinder-assembly of the second pulley. The known control system comprises a pump for generating a flow of hydraulic medium from a reservoir for hydraulic medium to the said piston/cylinder assemblies and at least two valves that are positioned in parallel, i.e. the flow generated by the pump essentially passes through either one of the said two valves. The control system is arranged such that the first cylinder pressure, the so-called line pressure, is controlled to a desired level by means of a first, or line pressure control valve and that the second cylinder pressure is set by means of a second valve. In the known control system the second valve is a flow valve that controls the said second cylinder pressure by allowing either a smaller or larger flow of medium from the first hydraulic line, where the said line pressure prevails, a smaller or larger flow of hydraulic medium from the second cylinder to the reservoir, where the prevailing pressure is relatively low, e.g. atmospheric pressure, or no flow of hydraulic medium at all. Consequently, the second cylinder pressure may in principle be set at a value anywhere in the range between the pressure in the reservoir and the line pressure.

Although the control system of the known CVT is capable of achieving adequate clamping force levels for realising a desired torque transmitting capacity and speed ratio of the CVT, it was found in practice that the accuracy and the stability with which the known control system controls the second cylinder pressure is not optimal. Moreover, particularly when the CVT is at standstill, i.e. when the shafts are not rotating, it proves to be difficult or even impossible to estimate and/or calculate the second cylinder pressure with a satisfying accuracy and without actually measuring it, which latter option is considered undesirable and expensive. In these circumstances, a sufficiently high second cylinder pressure can not be guaranteed by the known control system and the second cylinder pressure can unwittingly become so low that belt slip may occurs, either at standstill or immediately thereafter when the vehicle, in which the CVT is applied, is accelerating. This may disadvantageously affect the functioning of the CVT and, in particular, may reduce the service life of the drive belt.

SUMMARY OF THE INVENTION

It is an object of the present invention to improve the accuracy and stability with which the second cylinder pressure may be controlled and more in particular it is an object to reduce the risk of belt slip of the drive belt at standstill and/or during initial acceleration of a motor vehicle in which the CVT is applied.

According to the invention this object bay be achieved by a control system having the features discussed below. In the control system according to the invention the second valve or controlling the second cylinder pressure is influenced not only by a control pressure, but also by the second cylinder pressure itself, e.g. by creating a pressure feedback. Such influence may improve the accuracy of the second cylinder pressure control. Moreover, belt slip at or immediately after standstill may be effectively prevented with the control system according to the invention.

An insight underlying the invention is that in the known control system the actual level of the second cylinder pressure is determined and influenced indirectly by the amount of flow to and from the second cylinder. The said amount of flow may be very small in cases where there only exists the requirement to compensate for pressure losses due to leakage, i.e. steady state conditions, and in particular at stand still. The known second valve, i.e. the flow valve that is typically operated by a control pressure was found to be not particularly suite for accurate steering of such a small amount of flow. However, by allowing feedback of the second cylinder pressure, i.e. by involving the level of the second cylinder pressure on its own control, there may be realised a pressure control of the second cylinder pressure without the requirement of far-reaching modifications to the control system. It is a merit of the present invention that it drastically improves the functioning of the control system at standstill through a relatively easily implemented measure. A particularly advantageous control system may be realised by a negative influence of the feedback of the second cylinder pressure, i.e. by realising the said influence such that changes in the second cylinder pressure are counteracted. In this manner a stable level of the second cylinder pressure is achieved, independent of temporary fluctuations therein.

In a further development of the invention, the second valve for controlling the second cylinder pressure is additionally influenced by the line pressure. In case of the continuously variable transmission this is to be preferred, because usually when either one of the second cylinder pressure and the line pressure change the other pressure is desired to change too. According to the invention, it is in this case particularly advantageous if the influence of the line pressure is such that an increase or a decrease in the line pressure is reflected by an increase or a decrease in the second cylinder pressure respectively. The proportion between the line pressure and the second cylinder pressure may accordingly influence the second cylinder pressure. It was found that within the context of the present invention with the latter configuration the best results in terms of pressure stability and of pressure control accuracy may be achieved.

BRIEF DESCRIPTION OF THE DRAWINGS

In the following the invention is elucidated further with reference to the accompanying figures.

DESCRIPTION OF THE PREFERRED EMBODIMENTS

Figure 1:
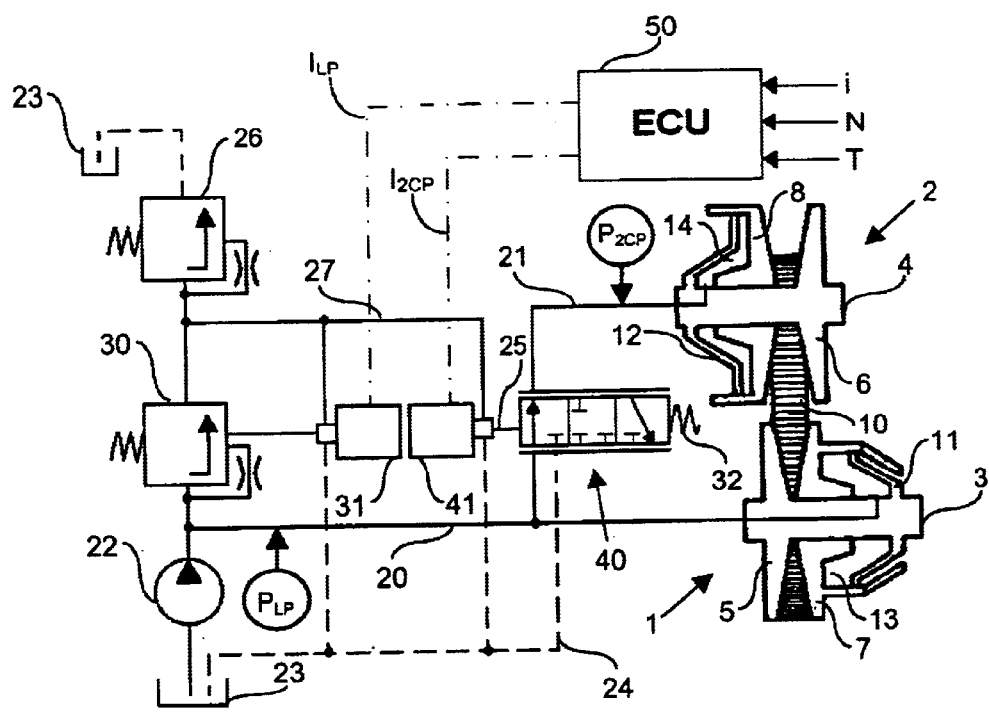
FIG. 1 shows a schematic representation of a CVT with a control system according to the state of the art.

FIG. 1 shows a schematic representation of a CVT with a control system according to the known art. The CVT comprises a first pulley 1 on a first shaft 3 and a second pulley 2 on a second shaft 4. A drive belt 10 is mounted on said pulleys 1, 2 for transmitting torque there between. Each pulley 1 or 2 comprises a fixed conical disc 5 or 6 and an axially moveable conical disc 7 or 8 respectively. Piston/cylinder-assemblies 11, 13 and 12, 14 are provided to enable the said movable disc 7 or 8 to be displaced towards the respective fixed disc 5 or 6, respectively under the influence of a first cylinder pressure, or line pressure $P_{LP}$ and a second cylinder pressure $P_{2CP}$. Thereby a running radius of the drive belt 10 between each of said pairs of conical pulley discs 5, 7 and 6, 8 and accordingly a transmission speed ratio i between the first and second shafts 3 and 4 of the CVT may be continuously varied. The line pressure $P_{LP}$ varies between a few bar and 60 bar or more in a typical automotive application of the CVT.

Cylinders 13 and 14 of the piston/cylinder-assemblies 11, 13 and 12, 14 are connected to a control system by means of a first hydraulic line 20 and a second hydraulic line 21 respectively. The control system realises and controls the cylinder pressure $P_{LP}$ and the second cylinder pressure $P_{2CP}$ and comprises a main pump 22 for providing the control system with a flow of medium. The pump 22 thereto draws medium from a reservoir 23 and discharges the said medium in the first hydraulic line 20. A line pressure control valve 30 is provided to control the pressure of the medium discharged by the pump 22, which pressure is the line pressure $P_{LP}$. The known pressure control valve 30 is operable under the influence of a first, or line pressure control pressure that is effected by a first pressure regulator 31 in a generally known manner. The control system further provided with a flow-valve-type second valve 40 for setting the second cylinder pressure $P_{2CP}$ by allowing either a smaller or larger flow of medium from the first hydraulic line 20, where the said line pressure $P_{LP}$ prevails, to the second hydraulic line 21, a smaller or larger flow of medium from the second hydraulic line 21 to the reservoir 23, where the prevailing pressure is relatively low—usually atmospheric pressure—, or no flow of medium at all. The known second valve 40 is operable under the influence of a second control pressure $P_{2C}$ that is effected by a second pressure regulator 41 and that is communicated to the second valve 40 through further hydraulic line 25. The first and second pressure regulators 31 and 41 are connected to a further hydraulic line 27. The pressure prevailing in the said further hydraulic line 27 is set by a further pressure control valve 26. The said pressure regulators 31 and 41 are electronically controlled by an electronic control unit, or ECU 50, which unit 50 determines and/or calculates the appropriate respective control currents $I_{1CP}$ and $I_{2CP}$, based on a number of variables such as the speed ratio i, a speed N of the first or second shaft 3 or 4 and of a torque level T to be transmitted.

Figure 2:
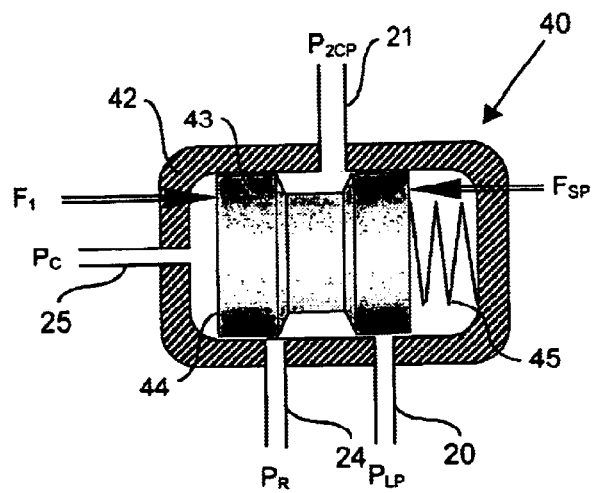
FIG. 2 is a simplified cross sectional view of a known second valve.

In FIG. 2 the known second valve 40 is shown in more detail. The valve 40 comprises a valve housing 42 that defines a cavity wherein a valve spool 43 is mounted axially movable. Hydraulic lines 20, 21 and 24 communicate with the said cavity, whereby the position of the valve spool 43 allows a smaller or larger flow between the second hydraulic line 21 and the first hydraulic line 20 or between the second hydraulic line 21 and the hydraulic line 24 leading to the reservoir 23. The said position of the valve spool 43 is determined by a balance between, on the one hand, a first force $F_1$ effected by the said second control pressure $P_{2C}$ acting on an axial end face 44 of the valve spool 43 and, on the other hand, a spring force $F_{SP}$ effected by a spring 45 that is positioned between the valve spool 43 and the valve housing 42 and that is oriented in a direction opposite to that of the said first force $F_1$, whereby the spring force $F_{SP}$ varies with the position of the valve spool 43.

Figure 3:
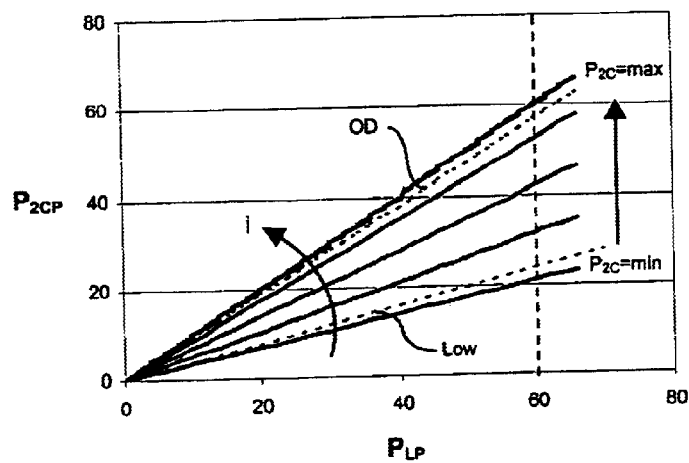
FIG. 3 depicts the relation between the line pressure and the second cylinder pressure in dependence on a second control current for the known CVT.

FIG. 3 depicts the relation between the line pressure $P_{LP}$ and the second cylinder pressure $P_{2CP}$ in dependence on the second control pressure $P_{2C}$ for the known CVT. As mentioned earlier, the transmission speed ratio i is dependent on the ratio or proportion between the second cylinder pressure $P_{2CP}$ and the line pressure $P_{LP}$ and may be varied between a smallest speed ratio i, commonly denoted Low, and a largest speed ratio i, commonly denoted Over Drive or OD. It is shown in FIG. 3 that the known control system is dimensioned such that with the available range of second control pressure levels ranging from $P_{2C}$min to $P_{2C}$max all speed ratios ranging from Low to OD may be realised. Moreover, from FIG. 3 it appears that with the known control system for each setting of the second control pressure $P_{2C}$ a specific proportion between the second cylinder pressure $P_{2CP}$ and the line pressure $P_{LP}$ is effected and accordingly a specific speed ratio i is realised. It is remarked that the dotted line at a line pressure level of 60 bar denotes the highest pressure in the CVT according to this example.

Figure 4:
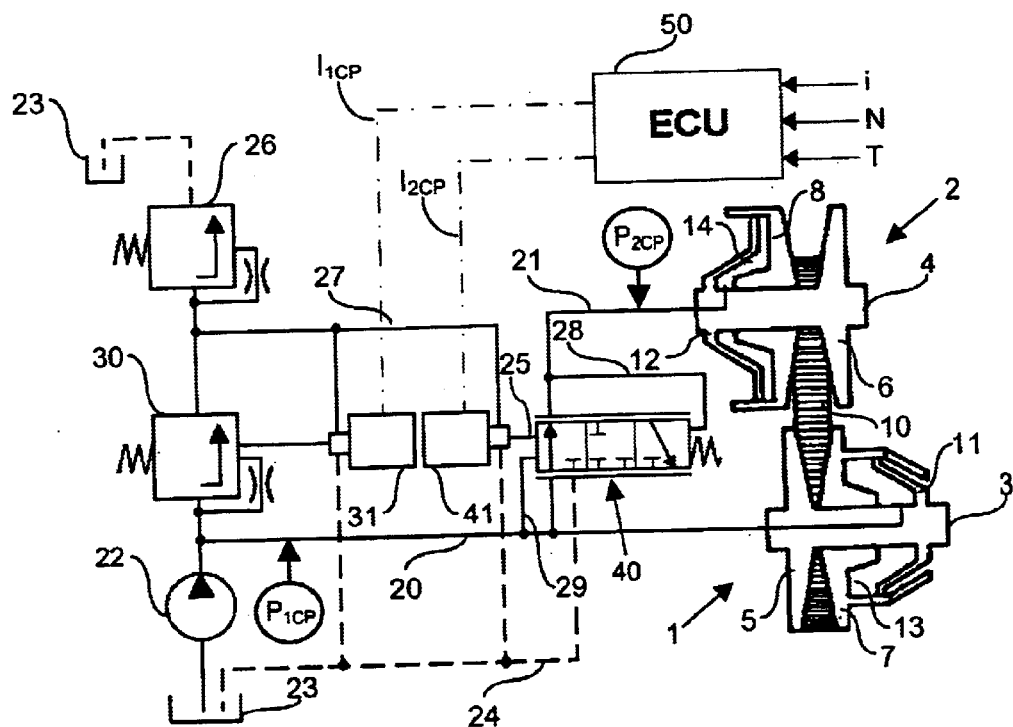
FIG. 4 shows a schematic representation of a CVT with a control system according to the invention.

FIG. 4 shows a schematic representation of a CVT with a control system according to the invention. In accordance with a preferred embodiment of the invention the control system has been adapted by incorporating further hydraulic lines 28 and 29, so that the second valve 40 is influenced not only by the second control pressure $P_{2C}$, but also by the second cylinder pressure $P_{2CP}$ and the line pressure $P_{LP}$. The second cylinder pressure $P_{2CP}$ may accordingly be influenced by the proportion between the second cylinder pressure $P_{2CP}$ and the line pressure $P_{LP}$. The influence of the second cylinder pressure $P_{2CP}$ is negative, i.e. such that changes in the second cylinder pressure $P_{2CP}$ are counteracted, whereas the influence of the line pressure $P_{LP}$ is positive, i.e. such that an increase or a decrease in the line pressure $P_{LP}$ is reflected by an increase or a decrease in the second cylinder pressure $P_{2CP}$ respectively, which may be taken from FIG. 4. With this control system the second cylinder pressure may be accurately and reliably controlled without measuring the said second cylinder pressure $P_{2CP}$, so that, amongst others, belt slip at, or immediately after standstill may be effectively prevented.

Figure 5:
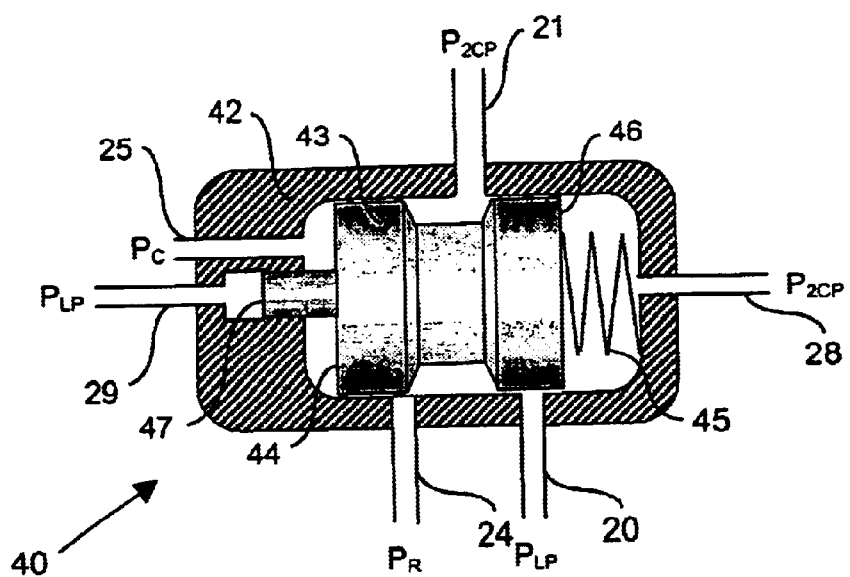
FIG. 5 is a simplified cross sectional view of a second valve suited for application in the control system according to the invention.

In FIG. 5 a second valve 40 for application in the CVT according to the invention is shown in more detail. The position of the valve spool 43 with respect to the hydraulic lines 20, 21 and 24 is now determined by a balance between, on the one hand, the said first force $F_1$ and a third force $F_3$ effected by the line pressure $P_{LP}$ acting on a further axial end face 47 of the valve spool 43 and, on the other hand, the said spring force $F_{SP}$ and a second force $F_2$ effected by the second cylinder pressure $P_{2CP}$ acting on a still further axial end face 46 of the valve spool 43, whereby the first force $F_1$ and the third force $F_3$ are oriented in a direction opposite to that of the spring force $F_{SP}$ and the second force $F_2$. The spring 45 thereby biases the valve spool 43.

Figure 6:
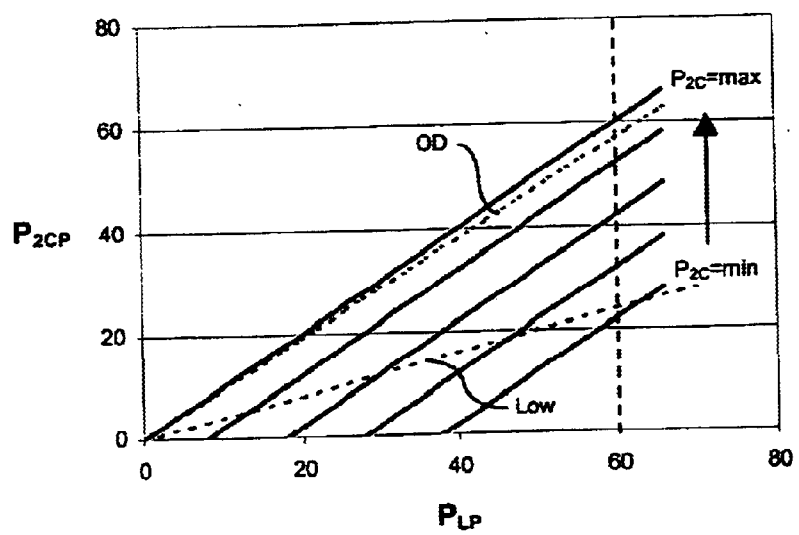
FIG. 6 depicts the relation between the line pressure and the second cylinder pressure in dependence on a second control current for a first embodiment of the CVT according to the invention.

FIG. 6 depicts the relation between the line pressure $P_{LP}$ and the second cylinder pressure $P_{2CP}$ in dependence on the second control pressure $P_{2C}$ for the CVT with the second valve 40 as depicted in FIG. 5. It is noted that the second control pressure levels range $P_{2C}$min; $P_{2C}$max and/or the surface area of the axial end faces 44, 46 and/or 47 are preferably set such that the balance of the said forces allows the proportion between the second cylinder pressure $P_{2CP}$ and the line pressure $P_{LP}$ to be set anywhere in the required range. In this example for instance, this means that even at the arbitrarily chosen maximum line pressure level of 60 bar, the second valve 40 is required to be capable to set the second cylinder pressure $P_{2CP}$ to such a level that the speed ratio Low is realised. Accordingly, the proportion between the second cylinder pressure $P_{2CP}$ and the line pressure $P_{LP}$ set at the minimum level of the control pressure $P_{2C}$min lies marginally below the proportion that defines speed ratio Low, at least for line pressure levels below 60 bar.

It is noted that with the conventional flow-valve-type second valve 40 having the characteristic as shown in FIG. 3, the proportion between the second cylinder pressure $P_{2CP}$ and the line pressure $P_{LP}$ remains essentially constant when the line pressure $P_{LP}$ is changed during operation of the CVT. Such a change may for instance be due to an increase or a decrease in the torque T generated by an engine of the motor vehicle that is to be transmitted by the CVT to driven wheels of the vehicle, generally on the demand of a driver of the vehicle. Accordingly, the transmission speed ratio i will change only slightly if at all. This behaviour is generally considered advantageous for reasons of controllability of the CVT and driving comfort of a vehicle in which the CVT is applied. Referring back to FIG. 6, it appears that with the second valve according to the invention the proportion between the second cylinder pressure $P_{2CP}$ and the line pressure $P_{LP}$ has the tendency to change when the line pressure $P_{LP}$ changes. Accordingly, the speed ratio i has a tendency to change too. For instance, in case of a torque T increase and for a given rotational speed of the first shaft, i.e. the vehicle speed, the rotational speed of the second shaft, i.e. the engine speed, has a tendency to decrease. Such behaviour may be considered unfavourable, since for a large range of engine speeds the power and torque generated by the engine decrease with a decreasing engine speed which counteracts its cause, i.e. the increase in the torque T that is demanded by the driver.

According to the invention the above mentioned disadvantage may be largely overcome by setting an appropriate proportion between the surface area $A_{47}$ of the axial end face 47 on which the line pressure $P_{LP}$ acts and the surface area $A_{46}$ of the axial end face 46 on which the second cylinder pressure $P_{2CP}$ acts. This allows the characteristic of the second valve 40 according to the invention to be adapted such that for at least one speed ratio i the proportion between the second cylinder pressure $P_{2CP}$ and the line pressure $P_{LP}$ and thus also the speed i remain essentially constant when the line pressure $P_{LP}$ is raised or dropped. To minimise the tendency of the speed ratio i to change in dependency on torque changes, it may be preferable to set the said proportion of the surface areas $A_{47}$ and $A_{46}$ such that the speed ratio i remains essentially constant for a medium speed ratio i essentially halfway between Low and OD.

Figure 7:
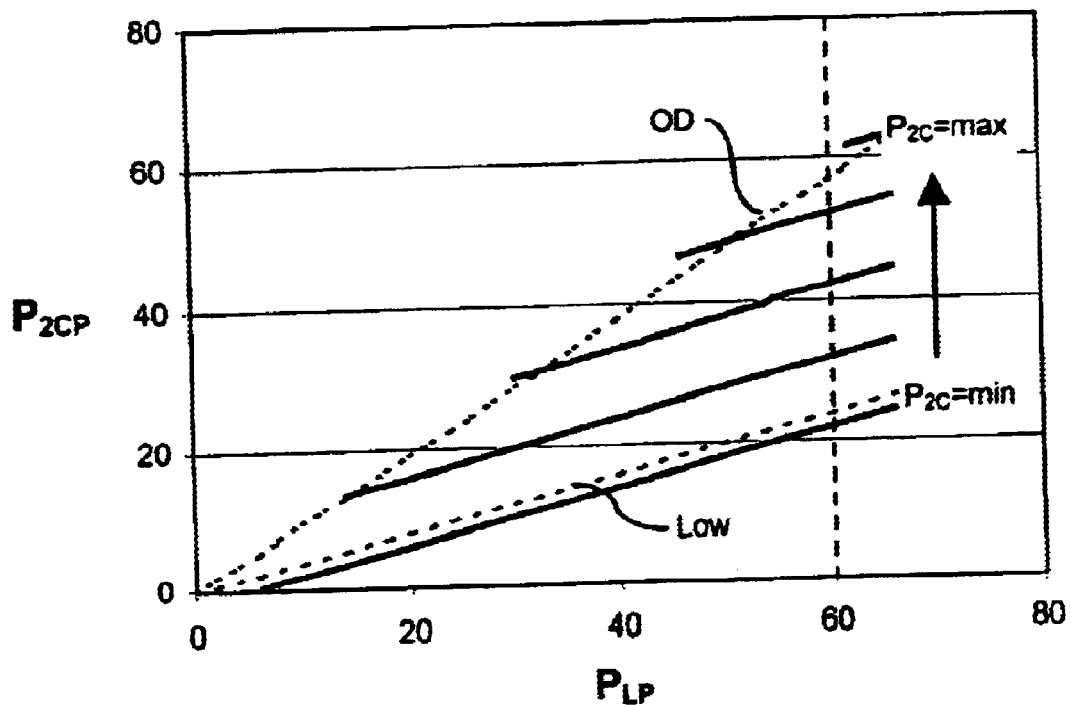
FIG. 7 depicts the relation between the line pressure and the second cylinder pressure in dependence on a second control current for a second embodiment of the CVT according to the invention.

However, according to invention it may be even more desirable to set the said proportion of the surface areas $A_{47}$ and $A_{46}$ such that the speed ratio i remains essentially constant in speed ratio Low, as is illustrated in FIG. 7. In this manner it is realised that in the speed ratio where the transmission is generally the most highly loaded, the said favourable behaviour occurs. Moreover, in every other speed ratio i between Low and OD the CVT has a tendency to shift towards Low when the torque T increases and towards OD when the torque T decreases. Such behaviour is desirable since it coincides with the control strategy that is usually adopted in the CVT, e.g. programmed into the ECU 50.

The actually required proportion of the surface areas $A_{47}$ and $A_{46}$ may be determined as follows. From FIG. 5 it is derived that the balance of forces acting on the valve spool is expressed as:

$$P_{2C} \cdot A_{44} + P_{LP} \cdot A_{47} = F_{SP} + P_{2CP} \cdot A_{46} \quad (1)$$

or, alternatively, as:

$$P_{2CP} \cdot A_{46} - P_{LP} \cdot A_{47} = F_{SP} - F_1 \quad (2)$$

For instance, if it is desired that the speed ratio i is independent from the line pressure $P_{LP}$ for speed ratio Low, as preferred by the invention, equation (2) needs to be solved for an axial position of the valve spool associated with speed ratio Low, which is desired to be fixed. In this situation both $F_{SP}$ and $F_1$ are essentially constant and thus:

$$(P_{2CP} \cdot A_{46})_{Low} - (P_{LP} \cdot A_{47})_{Low} = C_{Low} \quad (3)$$

To satisfy equation (3) changes in the first term of the equation must be compensated by changes in its second term. Thus equation (3) may be written as:

$$\Delta(P_{2CP} \cdot A_{46})_{Low} = \Delta(P_{LP} \cdot A_{47})_{Low} \quad (4)$$

The proportion between the second cylinder pressure $P_{2CP}$ and the line pressure $P_{LP}$ defining the speed ratio Low may depend on several parameters such as active surface areas of the piston/cylinder-assemblies 11, 13 and 12, 14. In the example of FIG. 7, the said pressure proportion is about 0.4. From equation (4) is thus appears that in order to maintain the pressure proportion constant in speed ratio Low the proportion between the associated respective surface areas is the inverse value thereof:

$$\left(\frac{P_{2CP}}{P_{LP}}\right)_{Low} = 0.4 = \left(\frac{A_{47}}{A_{46}}\right) \qquad (5)$$

It is remarked that equation (5) holds for any other speed ratio i provided the pressure proportion appropriate for such ratio i is selected. The actual surface areas of the axial end faces $A_{46}$ and $A_{47}$ may be determined by solving equation (1) taking into account the range in which the various pressures that act on the valve spool vary during operation of the CVT, as well as other characteristic of the second valve 40.

What is claimed is:

1. Control system for a continuously variable transmission that is provide with a first pulley (1) having two pulley discs (5, 7), with a second pulley (2) having two pulley discs (6, 8) and with a drive belt (10) wound around said pulleys (1, 2) for transmitting torque there between, at least one disc (7) of the first pulley (1) being axially movable with respect to the other disc (5) of said pulley (1) under the influence of an axial force provided on said movable disc (7) by a line pressure ($P_{LP}$) in a cylinder (13) of a piston/cylinder assembly (11, 13) associated with the first pulley (1) and at least one disc (6) of the second pulley (2) being axially movable with respect to the other disc (8) of said pulley (2) under the influence of an axial force provided on said movable disc (8) by a second cylinder pressure ($P_{2CP}$) in a cylinder (14) of a piston/cylinder assembly (12, 4) associated with the second pulley (2), which control system is arranged to control the second cylinder pressure ($P_{2CP}$) between two pressure levels ($P_{LP}$; $P_R$) by means of a second valve (40) that allows either a flow of medium from a first hydraulic line (20) where the line pressure prevails ($P_{LP}$) to the cylinder (14) of the piston/cylinder assembly (12, 14) associated with the second pulley (2), a flow of hydraulic medium from this latter cylinder (14) to a reservoir for hydraulic medium (23) where the prevailing pressure is relatively low or no flow of hydraulic medium at all under the influence of a control pressure ($P_{2C}$), characterised an that the second valve (40) may be further influenced by the level of the second cylinder pressure ($P_{2CP}$).

2. Control system according to claim 1, characterised in that the influence of second cylinder pressure ($P_{2CP}$) is such that changes in the second cylinder pressure ($P_{2CP}$) are counteracted.

3. Control system according to claim 1, characterased an that the second valve (40) may be still further influenced by the level of the line pressure ($P_{LP}$).

4. Control system according to claim 3, characterised in that the influence of the line pressure ($P_{LP}$) is such that an increase or a decrease in the line pressure ($P_{LP}$) is reflected by an increase or a decrease in the second cylinder pressure ($P_{2CP}$) respectively.

5. Control system according to claim 4, characterised in that the influence of the line pressure ($P_{LP}$) and of the second cylinder pressure ($P_{2CP}$) is such that the proportion between the second cylinder pressure ($P_{2CP}$) and the line pressure ($P_{LP}$) remains essentially constant, at least for a specific level of the control pressure ($P_{2C}$).

6. Control system according to claim 1, characterised in that the control sys em is provided with a pump (22) for generating a flow of medium and with a line pressure control valve (30) for controlling the line pressure ($P_{LP}$) in the flow of medium generated by the pump (22).

7. Control system according to claim 6, characterised in that the flow of medium generated by the pump (22) predominantly passes either through the line pressure control valve (30) or through the second valve (40).

8. Control system according to claim 1, characterised in that the second valve (40) comprises a valve spool (43) that is provided axially movable in a valve housing (42), whereby an axial position of the valve spool (43) affects a flow of medium through the valve (40), which axial position may be influenced at least by a first force ($F_1$) effected by the control pressure ($P_C$) acting on an axial end face (44) of the valve spool (43) and a second force $F_2$) effected by the second cylinder pressure ($P_{2CP}$) acting on an axial end face (46) of the valve spool (43).

9. Control system according to claim 8, characterised in that the axial position of the valve spool (43) may be further influenced by a third force ($F_3$) effected by the line pressure ($P_{LP}$) acting on an axial end face (47) of the valve spool (43), whereby the third ($F_3$) force and the second force ($F_2$) are oriented in opposite directions.

10. Control system according to claim 8, characterised in that the axial position of the valve spool (43) may be further influenced by spring force ($F_{SP}$) effected by a spring (45) acting on an axial end face (46) of the valve spool (43), whereby the spring force ($F_{SP}$) and the first force ($F_1$) are oriented in opposite directions.

11. Control system according to claim 1, characterised in that the first force ($F_1$) and the said second force ($F_2$) are oriented in opposite directions.

12. Continuously variable transmission provided with a control system according to claim 1.

13. Continuously variable transmission according to claim 12, characterised in that the flow of medium through the valve (40) may be influenced by the level of the control pressure ($P_{2C}$), by the level of the second cylinder pressure ($P_{2CP}$) and by the level of the line pressure ($P_{LP}$).

14. Continuously variable transmission according to claim 13, characterised in that, a proportion between the second cylinder pressure and the line pressure remains essentially constant at least for that proportion where the at least one disc (7) of the first pulley (1) is closest from the other disc (5) of the first pulley (1) and the at least one disc (6) of the second pulley (2) is farthest from the other disc (8) of the second pulley (2) during operation of the transmission.

15. A master/slave control system for a continuously variable transmission having a first pulley (1) with two pulley discs (5, 7), a second pulley (2) with two pulley discs (6, 8), and a drive belt (10) wound around the pulleys (1, 2) for transmitting torque between the first and second pulleys, at least one disc (7) of the first pulley (1) being axially movable with respect to the other disc (5) of the first pulley (1) under the influence of an axial force provided on the movable disc (7) by a first line pressure ($P_{LP}$) in a first cylinder (13) of a first piston/cylinder assembly (11, 13) associated with the first pulley (1) and at least one disc (6) of the second pulley (2) being axially movable with respect to the other disc (8) of the second pulley (2) under the influence of an axial force provided on the movable disc (8) by a second cylinder pressure ($P_{2CP}$) in a second cylinder (14) of a second piston/cylinder assembly (12, 14) associated with the second pulley (2), which control system is arranged so that the second cylinder pressure is derived from the first cylinder pressure, the control system controlling the second cylinder pressure ($P_{2CP}$) between two pressure levels ($P_{LP}$; $P_R$) by a second valve (40) that allows each of a flow of hydraulic medium from a first hydraulic line (20) where the first line pressure ($P_{LP}$) prevails to the second cylinder (14), a flow of hydraulic medium from the second cylinder (14) to a reservoir for hydraulic medium (23) where the prevailing pressure is relatively low, and no flow of hydraulic medium at all under the influence of a control pressure ($P_{2C}$), wherein the second valve (40) may be further influenced by the level of the second cylinder pressure ($P_{2CP}$).

16. A continuously variable transmission and master/slave control system, comprising:

a first pulley (1) with two pulley discs (5, 7);

a second pulley (2) with two pulley discs (6, 8);

a drive belt (10) wound around the pulleys (1, 2) for transmitting torque between the first and second pulleys, at least one disc (7) of the first pulley (1) being axially movable with respect to the other disc (5) of the first pulley (1) under the influence of an axial force provided on the movable disc (7) by a first line pressure ($P_{LP}$) in a first cylinder (13) of a first piston/cylinder assembly (11, 13) associated with the first pulley (1) and at least one disc (6) of the second pulley (2) being axially movable with respect to the other disc (8) of the second pulley (2) under the influence of an axial force provided on the movable disc (8) by a second cylinder pressure ($P_{2CP}$) in a second cylinder (14) of a second piston/cylinder assembly (12, 14) associated with the second pulley (2); and a control system including a first valve and a second valve, the first valve (30) arranged to set the first line pressure ($P_{LP}$), the second valve (40) arranged to control the second cylinder pressure ($P_{2CP}$) between two pressure levels ($P_{LP}$; $P_R$), the second valve (40) allowing each of a flow of hydraulic medium from a first hydraulic line (20) where the first line pressure ($P_{LP}$) prevails to the second cylinder (14), a flow of hydraulic medium from the second cylinder (14) to a reservoir for hydraulic medium (23) where the prevailing pressure is relatively low, and no flow of hydraulic medium at all under the influence of a control pressure ($P_{2C}$), wherein the second valve (40) may be further influenced by the level of the second cylinder pressure ($P_{2CP}$) and the second cylinder pressure is derived from the first cylinder pressure.

* * * * *